United States Patent
Ikeda et al.

(10) Patent No.: US 9,623,742 B2
(45) Date of Patent: Apr. 18, 2017

(54) VEHICLE BATTERY MOUNTING STRUCTURE

(71) Applicant: TOYOTA JIDOSHA KABUSHIKI KAISHA, Toyota-shi, Aichi-ken (JP)

(72) Inventors: Koki Ikeda, Toyota (JP); Kiyoshi Hokazono, Toyota (JP); Shinya Kamimura, Toyota (JP); Kentaro Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 14/892,400

(22) PCT Filed: May 21, 2014

(86) PCT No.: PCT/IB2014/000793
§ 371 (c)(1),
(2) Date: Nov. 19, 2015

(87) PCT Pub. No.: WO2014/188259
PCT Pub. Date: Nov. 27, 2014

(65) Prior Publication Data
US 2016/0114667 A1 Apr. 28, 2016

(30) Foreign Application Priority Data

May 24, 2013 (JP) .................................. 2013-110141
Dec. 25, 2013 (JP) .................................. 2013-267961

(51) Int. Cl.
*B60K 1/04* (2006.01)
*B62D 21/15* (2006.01)
(Continued)

(52) U.S. Cl.
CPC ............ *B60K 1/04* (2013.01); *B60L 11/1896* (2013.01); *B62D 21/157* (2013.01);
(Continued)

(58) Field of Classification Search
CPC .............. B60K 1/04; B60K 2001/0438; B60K 2015/03039; B60L 3/0007; B60L 11/1896;
(Continued)

(56) References Cited

U.S. PATENT DOCUMENTS 5,620,057 A * 4/1997 Klemen .................... B60K 1/04
180/65.1
6,040,080 A 3/2000 Minami et al.
(Continued)

FOREIGN PATENT DOCUMENTS

DE  102009037138 A1  2/2011
JP     07246845 A  *  9/1995
(Continued)

*Primary Examiner* — J. Allen Shriver, II
*Assistant Examiner* — Steve Clemmons
(74) *Attorney, Agent, or Firm* — Oliff PLC

(57) ABSTRACT

A vehicle battery mounting structure includes i) a battery frame that includes a battery upper frame made of fiber-reinforced resin and a battery lower frame made of fiber-reinforced resin, and that is arranged on a vehicle body lower side of a floor panel and supports a battery; and ii) a ductile member that has an upper main body portion joined to the battery upper frame, an upper flange portion continuously provided on a vehicle width direction outside end portion of the upper main body portion, a lower main body portion joined to the battery lower frame, and a lower flange portion continuously provided on a vehicle width direction outside end portion of the lower main body portion, in which the upper flange portion and the lower flange portion are overlapped and fixed to a lower surface side of the floor panel.

11 Claims, 7 Drawing Sheets

(51) Int. Cl.
*B62D 25/20* (2006.01)
*H01M 2/10* (2006.01)
*B60L 11/18* (2006.01)

(52) U.S. Cl.
CPC ...... *B62D 25/2036* (2013.01); *H01M 2/1083* (2013.01); *H01M 2/1094* (2013.01); *B60K 2001/0438* (2013.01); *B60Y 2306/01* (2013.01); *H01M 2220/20* (2013.01)

(58) Field of Classification Search
CPC ...... H01M 2/10; H01M 2/1083; B62D 25/20; B62D 21/15; B62D 21/157; B62D 27/026
See application file for complete search history.

(56) References Cited

U.S. PATENT DOCUMENTS

| | | | | |
|---|---|---|---|---|
| 7,610,978 B2 * | 11/2009 | Takasaki | ............... | B60K 1/04 180/65.1 |
| 7,641,017 B2 * | 1/2010 | Nozaki | ............... | B60K 1/04 180/291 |
| 7,654,351 B2 * | 2/2010 | Koike | ............... | B60K 1/04 180/68.1 |
| 7,914,942 B2 * | 3/2011 | Kato | ............... | B60K 1/04 429/507 |
| 7,931,105 B2 * | 4/2011 | Sato | ............... | B60K 1/04 180/2.1 |
| 7,955,729 B2 * | 6/2011 | Onuki | ............... | H01M 2/1022 429/153 |
| 8,051,934 B2 * | 11/2011 | Kiya | ............... | B60K 1/04 180/274 |
| 8,210,301 B2 * | 7/2012 | Hashimoto | ............... | B60K 1/04 180/68.5 |
| 8,372,530 B2 * | 2/2013 | Kubota | ............... | B60K 1/04 180/65.1 |
| 8,403,090 B2 * | 3/2013 | Fujiwara | ............... | H01M 2/1077 180/68.5 |
| 8,409,725 B2 * | 4/2013 | Hashimura | ............... | B21J 15/025 428/594 |
| 8,833,839 B2 * | 9/2014 | Young | ............... | B62D 25/02 296/187.08 |
| 8,932,769 B2 * | 1/2015 | Ohashi | ............... | B62D 25/20 180/65.31 |
| 8,980,458 B2 * | 3/2015 | Honjo | ............... | B60K 1/04 429/100 |
| 9,034,502 B2 * | 5/2015 | Kano | ............... | B60K 1/04 429/99 |
| 9,056,631 B2 * | 6/2015 | Nakamori | ............... | B60K 1/04 |
| 2008/0196957 A1 | 8/2008 | Koike et al. | | |
| 2008/0318119 A1 * | 12/2008 | Watanabe | ............... | B60L 11/1874 429/99 |
| 2009/0152034 A1 | 6/2009 | Takasaki et al. | | |
| 2009/0186266 A1 * | 7/2009 | Nishino | ............... | B60K 1/04 429/120 |
| 2012/0103714 A1 * | 5/2012 | Choi | ............... | B60K 1/04 180/68.5 |
| 2012/0251863 A1 * | 10/2012 | Berger | ............... | H01M 2/1083 429/99 |
| 2012/0321927 A1 * | 12/2012 | Loo | ............... | B60K 1/04 429/100 |
| 2013/0252059 A1 * | 9/2013 | Choi | ............... | B29C 70/20 429/100 |
| 2014/0300141 A1 * | 10/2014 | Hihara | ............... | B62D 29/041 296/193.07 |

FOREIGN PATENT DOCUMENTS

| | | |
|---|---|---|
| JP | H10-162797 A | 6/1998 |
| JP | 2003-237390 A | 8/2003 |
| JP | 3529008 B2 | 5/2004 |
| JP | 3606415 B2 | 1/2005 |
| JP | 4306783 B2 | 8/2009 |
| JP | 2011-146288 A | 7/2011 |

\* cited by examiner

VEHICLE BATTERY MOUNTING STRUCTURE

BACKGROUND OF THE INVENTION

1. Field of the Invention

The invention relates to a vehicle battery mounting structure.

2. Description of Related Art

Japanese Patent No. 3606415, for example, describes a structure in which a battery frame that houses a driving battery arranged below a floor portion of an electric vehicle is made of fiber-reinforced resin material (FRP: fiber-reinforced plastic) and is fixed to a side frame (an under member) arranged on a left and right of a lower surface of the floor portion.

However, when the battery frame is made of fiber-reinforced resin material, a fixing portion on the battery frame side that is fixed to the under member (on the floor portion side) may break from an impact load input from a side collision of the vehicle, so there is room for improvement in a structure that inhibits this fixing portion from breaking.

SUMMARY OF THE INVENTION

The invention thus provides a vehicle battery mounting structure capable of inhibiting a fixing portion that is on a side with a battery frame made of fiber-reinforced resin material and that is fixed to a floor portion side, from breaking when a side collision of a vehicle occurs.

A first aspect of the invention relates to a vehicle battery mounting structure that includes a battery frame that includes a battery upper frame made of fiber-reinforced resin and a battery lower frame made of fiber-reinforced resin, and that is arranged on a vehicle body lower side of a floor panel and supports a battery; and a ductile member that has an upper main body portion joined to the battery upper frame, an upper flange portion continuously provided on a vehicle width direction outside end portion of the upper main body portion, a lower main body portion joined to the battery lower frame, and a lower flange portion continuously provided on a vehicle width direction outside end portion of the lower main body portion, in which the upper flange portion and the lower flange portion are overlapped and fixed to a lower surface side of the floor panel.

With this structure, the upper flange portion continuously provided with the upper main body portion that is joined to the battery frame, and the lower flange portion continuously provided with the lower main body portion that is joined to the battery frame are overlapped and fixed to the lower surface side of the floor panel. Therefore, even if some of the impact load is input to the upper flange portion and the lower flange portion via the floor panel when there is a side collision of the vehicle, the upper flange portion and the lower flange portion have ductility, and thus will not break simply by bending and deforming. That is, according to the invention, the fixing portion that is on the side with the battery frame made of fiber-reinforced resin and that is fixed to the floor portion side, is inhibited or prevented from breaking.

The vehicle battery mounting structure may also include an intermediate member arranged between the battery upper frame and the battery lower frame, and the lower main body portion may be sandwiched by the intermediate member and the battery lower frame.

With this structure, the lower main body portion is sandwiched by the intermediate member and the battery lower frame. Therefore, even if the upper flange portion and the lower flange portion bend and deform when there is a side impact of the vehicle, the lower main body portion is inhibited or prevented from peeling away from the battery lower frame.

The battery lower frame may be such that a vehicle width direction outside end portion thereof extends to a boundary portion between the lower main body portion and the lower flange portion.

With this structure, the vehicle width direction outside end portion of the battery lower frame extends to the boundary portion between the lower main body portion and the lower flange portion. Therefore, some of the impact load that heads toward the vehicle width direction inside that is input when there is a side impact of the vehicle is efficiently transmitted to the battery frame via the battery lower frame.

The vehicle battery mounting structure may also include an intermediate member arranged between the battery upper frame and the battery lower frame, and the upper main body portion may be sandwiched by the intermediate member and the battery upper frame.

With this structure, the upper main body portion is sandwiched by the intermediate member and the battery upper frame. Therefore, even if the upper flange portion and the lower flange portion bend and deform when there is a side impact of the vehicle, the upper main body portion is inhibited or prevented from peeling away from the battery upper frame.

The upper flange portion may have an inclined portion that is inclined downward toward a vehicle width direction inside, on the upper main body portion side of the upper flange portion, and to a vehicle width direction outside of the battery frame.

With this structure, the upper flange portion has an inclined portion that is inclined downward toward a vehicle width direction inside, on the upper main body portion side of the upper flange portion, and to a vehicle width direction outside of the battery frame. Therefore, when there is a side impact of the vehicle, the upper flange portion will tend to bend and deform with the boundary portion with the upper main body portion as the fulcrum, so the stress load applied to the battery frame is able to be reduced.

The upper flange portion may have a recessed portion that is U-shaped when viewed from a vehicle body longitudinal direction, on the upper main body portion side of the upper flange portion, and to a vehicle width direction outside of the battery frame.

With this structure, the upper flange portion has a recessed portion that is U-shaped when viewed from a vehicle body longitudinal direction, on the upper main body portion side of the upper flange portion, and to a vehicle width direction outside of the battery frame. Therefore, when there is a side impact of the vehicle, the upper flange portion will tend to bend and deform with the boundary portion with the upper main body portion, i.e., the recessed portion, as the fulcrum, so the stress load applied to the battery frame is able to be reduced. A U-shaped in the invention also includes a V-shaped and a general U-shaped that is not a precise U-shape.

The ductile member may have a joining portion where the upper main body portion side of the upper flange portion and the lower main body portion side of the lower flange portion are joined. The upper main body portion side of the upper flange portion, and the lower main body portion side of the lower flange portion are joined by joining means.

With this structure, the upper main body portion side of the upper flange portion, and the lower main body portion side of the lower flange portion are joined by joining means. Therefore, when there is a side impact of the vehicle, the upper main body portion side of the upper flange portion and the lower main body portion side of the lower flange portion will not peel away, and the upper flange portion will bend and deform even more easily with the boundary portion with the upper main body portion as the fulcrum. Accordingly, the stress load applied to the battery frame is able to be reduced even more, and the upper main body portion is further inhibited or prevented form peeling away from the battery frame.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
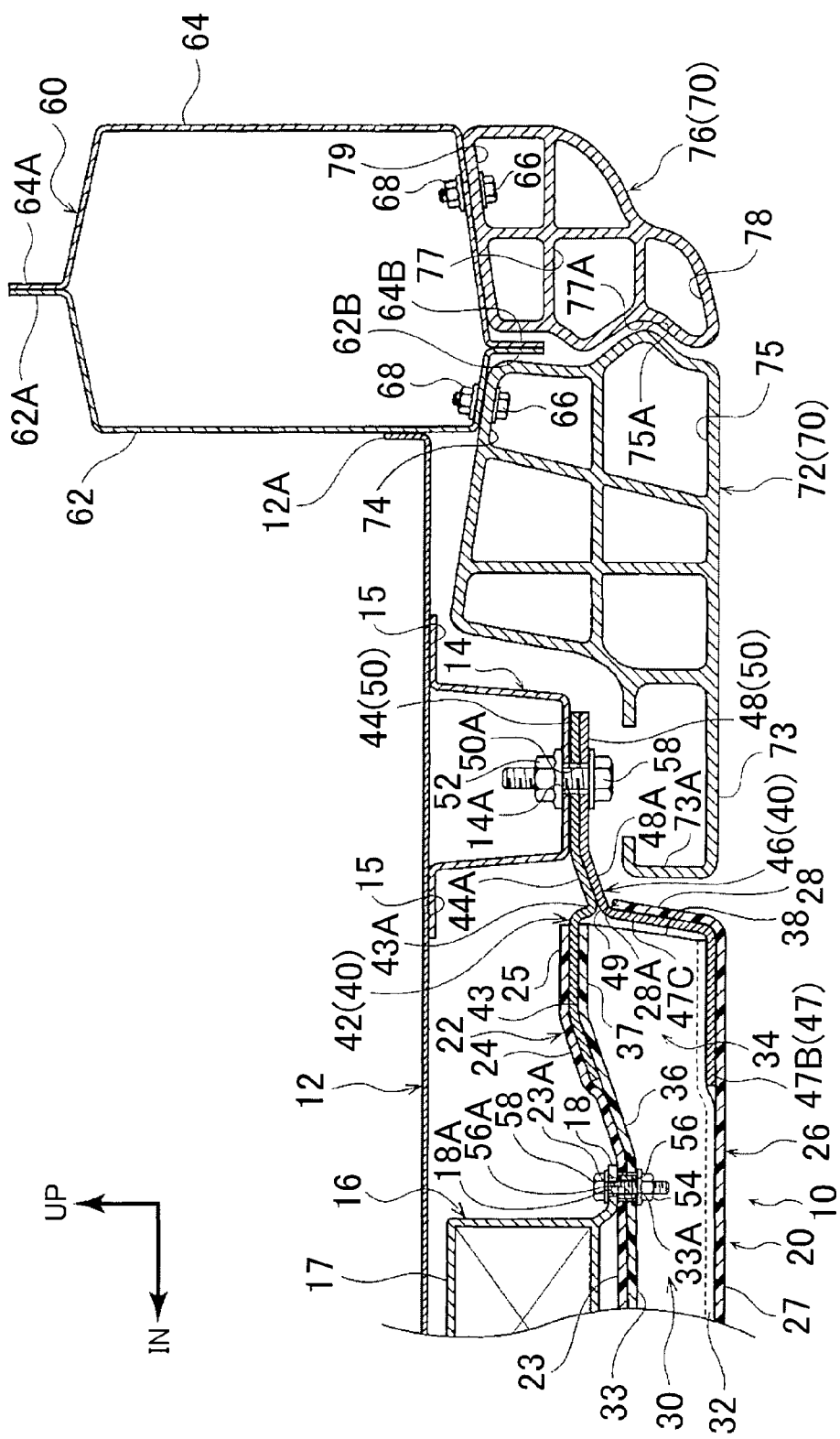
FIG. 1 is a front sectional view of a vehicle battery mounting structure according to an example embodiment of the invention.

Hereinafter, an example embodiment will be described in detail with reference to the accompanying drawings. To simplify the description, arrow UP in the drawings indicates a vehicle body upward direction, arrow FR in the drawings indicates a vehicle body forward direction, and arrow IN in the drawings indicates a vehicle width direction inside. Also, in the description below, unless otherwise specified, when left and right directions are used, they represent left and right in the left-right direction of the vehicle body (i.e., the vehicle width direction). Furthermore, although the drawings show only the left side of the vehicle body, the right side of the vehicle body is bilaterally symmetrical and thus the same, so a description of the right side of the vehicle body will be omitted as appropriate.

As shown in FIG. 1, a pair of left and right under members (side frames) 14 that extend in the vehicle body longitudinal direction and form a vehicle body frame structure are joined to a lower surface of a metal floor panel 12 that forms a floor portion of a vehicle body. These under members 14 are made of metal and have a generally hat-shaped cross-section. A flange portion 15 that protrudes out in the vehicle width direction is joined and fixed by welding or the like to a lower surface of the floor panel 12 on both end portion sides in the vehicle width direction.

Also, a plurality of through-holes 14A for inserting flange bolts 58 that will be described later are formed in the under members 14 along the longitudinal direction (the vehicle body longitudinal direction). Also, weld nuts 52 that are coaxial with the through-holes 14A are provided on an upper surface of the under members 14. Hereinafter, portions that are provided in plurality, such as the under members 14, the through-holes 14A, and the weld nuts 52 and the like, will be referred to in the singular when possible to facilitate understanding.

A vehicle battery mounting structure 10 according to this example embodiment that is applied to a vehicle such as an electric vehicle has a battery frame (a stack frame) 20 that is arranged on a vehicle body lower side of the floor panel 12 and supports a fuel cell stack 16 that serves as a battery, from the vehicle body lower side. This battery frame 20 is made of a fiber-reinforced resin (FRP: fiber-reinforced plastic), such as carbon fiber-reinforced resin material (CFRP: carbon fiber-reinforced plastic), for example.

An exterior portion 17 of the fuel cell stack 16 is made of metal (or resin) in a rectangular box shape. A protruding portion 18 that protrudes toward a vehicle width direction outside or the like is integrally formed in a plurality Of predetermined positions on a lower end peripheral edge portion of this exterior portion 17. Also, a through-hole 18A for inserting a flange bolt 58 that will be described later is formed in each protruding portion 18.

Figure 2:
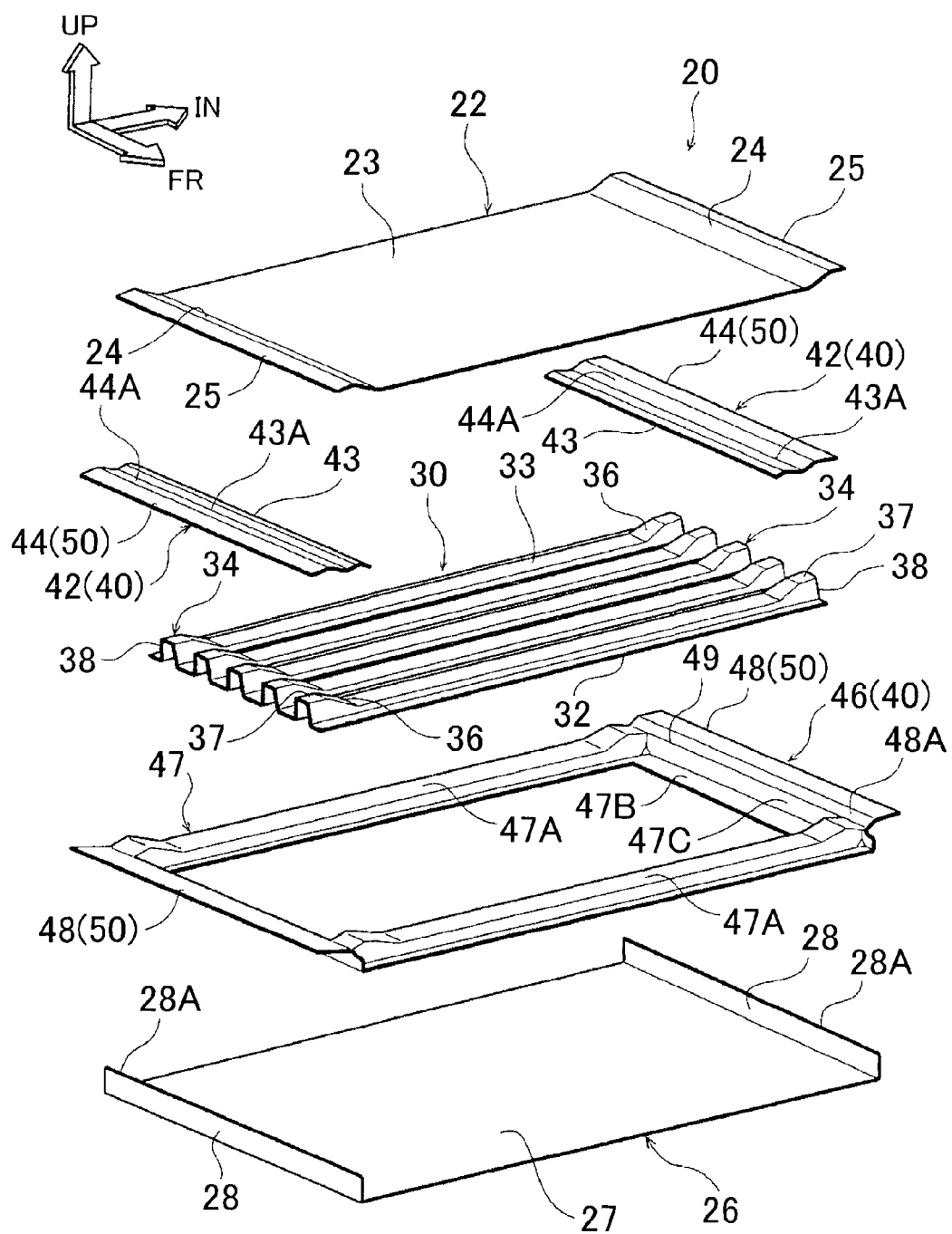
FIG. 2 is an exploded perspective view of a ductile member and a battery frame that forms the vehicle battery mounting structure according to the example embodiment.

As shown in FIGS. 1 and 2, the battery frame 20 includes an upper frame 22 as a battery upper frame, a lower frame 26 as a battery lower frame, and a core member 30 as an intermediate member (a reinforcing member) provided between the upper frame 22 and the lower frame 26.

The upper frame 22 has a rectangular flat plate-shaped top portion 23, a rectangular flat plate-shaped inclined portion 24 that is integrally and continuously provided inclined upward toward the vehicle width direction outside so as to follow an inclined wall 36 that will be described later, on both end portions of the top portion 23 in the vehicle width direction, and a rectangular flat plate-shaped flange portion 25 that is integrally and continuously provided substantially horizontal toward the vehicle width direction outside so as to follow an upper wall 37 that will be described later on both end portions of the inclined portion 24 in the vehicle width direction.

The lower frame 26 has a rectangular flat plate-shaped bottom portion 27, and a rectangular flat plate-shaped side wall portion 28 that is integrally and continuously provided substantially vertically toward the vehicle body upper side on both end portions of the bottom portion 27 in the vehicle width direction. When a lower ductile member 46 that will be described later is joined to the lower frame 26, the height of this side wall portion 28 is a height that reaches (extends to) a boundary portion 49 between a side wall portion 47C of a lower main body portion 47 of this lower ductile member 46, and a lower flange portion 48.

The core member 30 has a main body portion 32 in which protruding portions 33 having generally hat-shaped cross-sections that extend in the vehicle width direction are formed lined up in a plurality of rows (five rows for example) in the vehicle body longitudinal direction, and protruding portions 34 formed continuing from the protruding portions 33 and protruding toward the vehicle body upper side at both end portions of the main body portion 32 in the vehicle width direction.

The vehicle width direction inside of each protruding portion 34 is an inclined wall 36 that inclines upward toward the vehicle width direction outside. An upper wall 37 that is substantially horizontal and heads toward the vehicle width direction outside is integrally and continuously provided on an upper end portion of the inclined wall 36. Also, a vehicle width direction outside end portion of the protruding portion 34 is an end surface portion 38 that has a substantially perpendicular cross-section with respect to the main body portion 32. That is, this protruding portion 34 is formed in a generally trapezoidal shape in a front view when viewed from the vehicle body longitudinal direction.

Also, a lower surface of the top portion 23 of the upper frame 22 is joined by adhesive to an upper surface of each protruding portion 33 of the core member 30, and an upper surface of the bottom portion 27 of the lower frame 26 is joined by adhesive to a lower surface of the main body portion 32 of the core member 30, thereby substantially forming the battery frame 20 having a rectangular closed sectional structure.

As shown in FIG. 1, through-holes 23A and 33A that are communicated together are formed in a plurality of predetermined positions in the top portion 23 of the upper frame 22 and the protruding portion 33 of the core member 30, respectively. A flange nut 54 is joined, coaxially with the through-holes 23A and 33A, by adhesive to a lower surface of the protruding portion 33. Also, a metal cylindrical collar member 56 is integrally and coaxially provided on an upper surface of each flange nut 54. The collar members 56 are inserted into the through-holes 23A and 33A.

Therefore, the fuel cell stack 16 is fastened and fixed to the battery frame 20 (i.e., the upper frame 22) by placing the fuel cell stack 16 onto the upper surface of the upper frame 22 (i.e., the top portion 23) such that the through-hole 18A of the protruding portion 18 is communicated with the through-hole 56A of the collar member 56, inserting the flange bolt 58 through the through-hole 18A and the through-hole 56A from the vehicle body upper side, and screwing the flange bolt 58 to the flange nut 54.

Also, as shown in FIGS. 1 and 2, an upper main body portion 43 of the left and right pair of upper ductile members 42 that form the upper side of a ductile member 40 is arranged between and joined to a lower surface of the inclined portion 24 and the flange portion 25 of the upper frame 22, and an upper surface of the inclined wall 36 and an upper wall 37 (i.e., the protruding portion 34) of the core member 30.

More specifically, a length direction of the upper ductile member 42 is the vehicle body longitudinal direction, and an upper surface of the upper main body portion 43 that is a vehicle width direction inside portion of the upper ductile member 42 is joined by adhesive to the lower surface of the inclined portion 24 and the flange portion 25 of the upper frame 22, and a lower surface of the upper main body portion 43 is joined by adhesive to the upper surface of the inclined wall 36 and the upper wall 37 of the core member 30.

That is, the upper main body portion 43 of the upper ductile member 42 is fixed sandwiched by the upper frame 22 and the care member 30. Also, an upper flange portion 44 (i.e., a vehicle width direction outside portion of the upper ductile member 42) that protrudes toward the vehicle width direction outside from the flange portion 25 of the upper frame 22 and an end surface portion 38 (i.e., the battery frame 20) of the core member 30, is integrally and continuously provided on a vehicle width direction outside end portion of the upper main body portion 43.

A lower main body portion 47 of the lower ductile member 46 that forms the lower side of the ductile member 40 is arranged on and joined to an upper surface of the bottom portion 27 of the lower frame 26. More specifically, the lower ductile member 46 has the lower main body portion 47 that has a rectangular frame shape, and a lower surface of the lower main body portion 47 (including a protruding portion 47B that will be described later) is joined by adhesive to the upper surface of the bottom portion 27 of the lower frame 26.

Therefore, the core member 30 is arranged inside the lower main body portion 47, and in this state, the lower surface of the main body portion 32 is joined by adhesive to the upper surface of the bottom portion 27 of the lower frame 26. Also, both end portions of the lower main body portion 47 in the vehicle body longitudinal direction are protruding portions 47A having generally hat-shaped cross-sections, and the upper surface of these protruding portions 47A is joined by adhesive to both the upper surface of the protruding portions 33 of the core member 30, and the lower surface of the top portion 23 of the upper frame 22.

Also, a rectangular flat plate-shaped protruding portion 47B that protrudes toward the vehicle width direction inside is formed on both end portions of the lower main body portion 47 in the vehicle width direction. A lower surface of the main body portion 32 of the core member 30 on the protruding portion 34 side is joined by adhesive to the upper surface of this protruding portion 47B. That is, the protruding portion 47B of the lower main body portion 47 is fixed sandwiched by the lower frame 26 and the core member 30.

Also, a portion to the vehicle width direction outside of the protruding portion 47B of the lower main body portion 47 is a side wall portion 47C formed substantially vertically toward the vehicle body upward side following the side wall portion 28 of the lower frame 26. Also, the height of this side wall portion 47C is substantially the same as the height of the side wall portion 28 that is the vehicle width direction outside end portion of the lower frame 26.

That is, the side wall portion 28 of the lower frame 26 extends toward the vehicle body upper side to the boundary portion 49 between the side wall portion 47C of the lower main body portion 47 and the lower flange portion 48 that will be described later. Also, the lower flange portion 48 that protrudes toward the vehicle width direction outside from an upper end portion 28A (i.e., the battery frame 20) of the side wall portion 28 of the lower frame 26 and the end surface portion 38 of the core member 30, is integrally and continuously provided on the vehicle width direction outside end portion of the side wall portion 47C.

Also, the upper flange portion 44 and the lower flange portion 48 that protrude toward the vehicle width direction outside from the battery frame 20 overlap with each other and are joined together by adhesive. The overlapping portion forms a flange portion 50 that is a fixing portion that is fixed to the under member 14 on the battery frame 20 side (i.e., the floor portion side). The ductile member 40 (i.e., the upper ductile member 42 and the lower ductile member 46) is made of metal such as a high-strength steel plate or ultra-high-strength steel plate, for example.

Also, as shown in FIG. 1, a plurality of through-holes 50A for inserting the flange bolts 58 are formed in the vehicle body longitudinal direction in the flange portion 50 that is formed by the upper flange portion 44 and the lower flange portion 48 (each through-holes 50A is formed of a hole of the upper flange portion 44 and a hole of the lower flange portion 48 that are communicated with each other). Therefore, the battery frame 20 is fastened and fixed to the under member 14 via the ductile member 40 (i.e., the flange portion 50) by inserting the flange bolts 58 through the through-holes 50A and the through-holes 14A from the vehicle body under side, and screwing the flange bolts 58 to the weld nuts 52.

Also, as shown in FIGS. 1 and 2, an inclined portion 44A that serves as a bend initiator and that extends downward toward the vehicle width direction inside (i.e., toward a boundary portion 43A between the upper main body portion 43 and the upper flange portion 44) is formed on the upper main body portion 43 side of the upper flange portion 44, and to the vehicle width direction outside of the battery frame 20. Also, an inclined portion 48A that extends downward toward the vehicle width direction inside at the same angle as the inclined portion 44A is also formed on the lower main body portion 47 side of the lower flange portion 48 that overlaps with and is joined to the upper flange portion 44, and to the vehicle width direction outside of the battery frame 20.

Also, as shown in FIG. 1, the vehicle width direction outside end portion of the floor panel 12 is a bent portion 12A that is formed bent toward the vehicle body upper side. This bent portion 12A is joined by welding or the like to an inner panel 62 of a metal rocker 60. The rocker 60 includes the inner panel 62 that has a generally hat-shaped cross-section, and an outer panel 64 that also has a generally hat-shaped cross-section.

That is, the rocker 60 is formed as a rectangular closed sectional structure by an upper flange portion 64A of the outer panel 64 being joined by welding or the like to an upper flange portion 62A of the inner panel 62, and a lower flange portion 64B of the outer panel 64 being joined by welding or the like to a lower flange portion 62B of the inner panel 62.

Also, an energy absorbing member 70 made from metal is arranged between the battery frame 20 and the vehicle body lower side of the rocker 60 (including both end portions of the floor panel 12 in the vehicle width direction). The energy absorbing member 70 includes an inner member 72 arranged on the vehicle width direction inside so as to be close to the side wall portion 28, and an outer member 76 arranged having a predetermined gap (a gap of a size that enables the lower flange portions 62B and 64B to be inserted) to the vehicle width direction outside of the inner member 72.

The inner member 72 is formed having a shape in which a plurality of (e.g., seven) block portions, each having a generally rectangular closed sectional shape (cylindrical) that extends in the vehicle body longitudinal direction, are integrally fitted together, and a side wall portion 73A that faces the vehicle width direction inside of a block portion 73 on the innermost side in the vehicle width direction is arranged close to the side wall portion 28 (i.e., arranged opposite the side wall portion 28 with a predetermined gap therebetween).

Also, the block portion 73 is fastened and fixed by a bolt and a weld nut, not shown, to the under member 14 excluding the fastening portion of the flange portion 50, and an upper side block portion 74 on the outermost side in the vehicle width direction is fastened and fixed by a bolt 66 and a weld nut 68 to the inner panel 62 of the rocker 60. As a result, the inner member 72 is arranged on the vehicle body lower side of both end portions of the floor panel 12 in the vehicle width direction.

The outer member 76 is formed having a shape in which a plurality of (e.g., five) block portions, each having a generally rectangular closed sectional shape (cylindrical) that extends in the vehicle body longitudinal direction, are integrally fitted together, and an upper side block portion 79 on the vehicle width direction outside is fastened and fixed by the bolt 66 and the weld nut 68 to the outer panel 64 of the rocker 60. As a result, the outer member 76 is arranged on the vehicle body lower side of the rocker 60.

Also, a protruding portion 75A that protrudes toward the vehicle width direction outside is formed on a lower side block portion 75 on the outermost side of the inner member 72 in the vehicle width direction. Also, a recessed portion 77A that is recessed toward the vehicle width direction outside is formed, so as to accommodate the protruding portion 75A (i.e., so that there is no contact with the protruding portion 75A), at a boundary portion between a lower side block portion 77 and a block portion 78 on the vehicle width direction inside of the outer member 76.

When the outer member 76 moves toward the inner member 72 side due to a side impact of the vehicle, this recessed portion 77A engages with (i.e., contacts) the protruding portion 75A, enabling some of the impact load to be efficiently transmitted from the outer member 76 to the inner member 72. That is, the outer member 76 and the inner member 72 are configured to be able to become one and plastic deform (crumple) toward the vehicle width direction inside.

Next, the operation of the vehicle battery mounting structure 10 having a structure such as that described above will be described. That is, the operation when a vehicle collides in a side impact with a metal pole P (i.e., an obstacle) having a circular cylindrical shape (or a cylindrical shape) that extends in the vertical direction, for example, as shown in FIG. 3, will be described.

Figure 3:
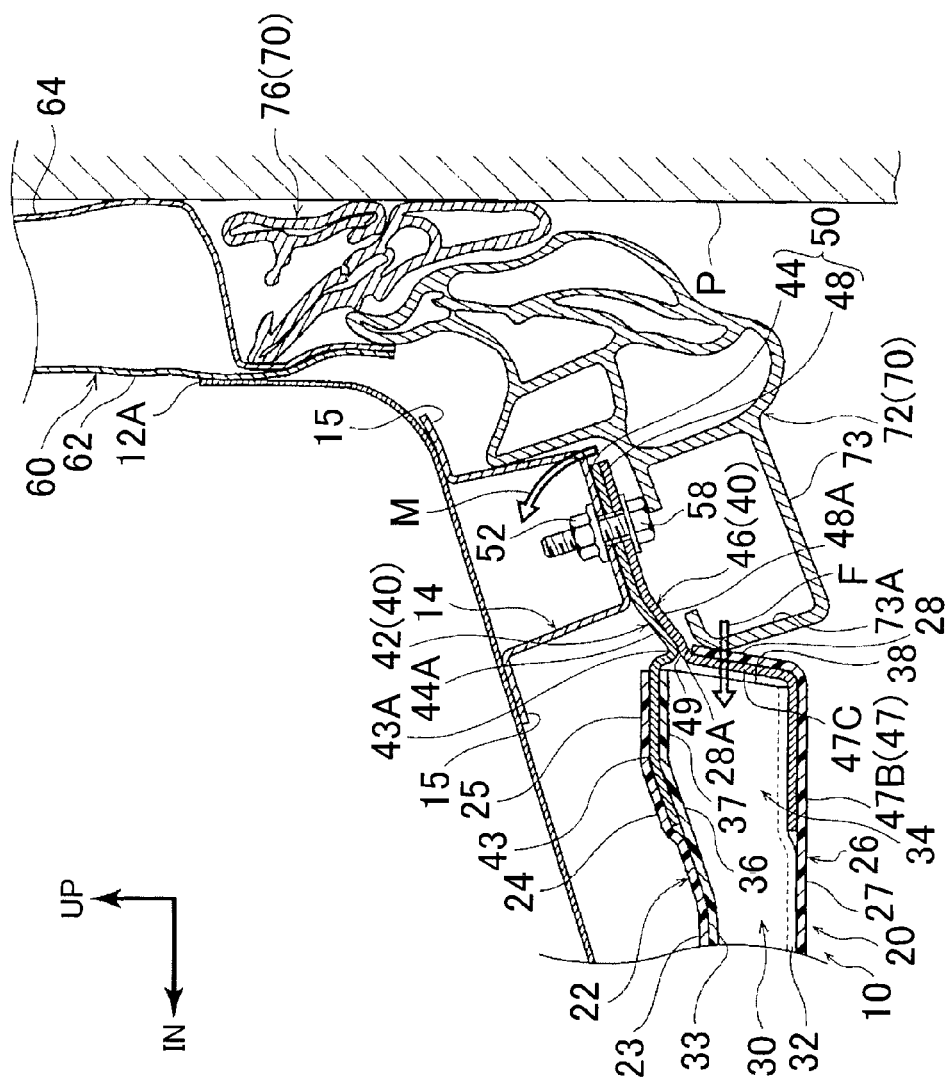
FIG. 3 is a front sectional view of a state in which a vehicle provided with the vehicle battery mounting structure according to the example embodiment has collided with a pole in a side impact.

When the vehicle collides with the pole P in a side impact, an excessive impact load toward the vehicle width direction inside is input to the rocker 60 and the energy absorbing member 70, as shown in FIG. 3. When the impact load is input from the vehicle width direction outside, the rocker 60 moves while plastic deforming toward the vehicle width direction inside, absorbing some of the impact load that is input, and transmitting some of the rest of the impact load to the floor panel 12.

When some of the impact load is transmitted to the floor panel 12, the vehicle width direction outside end portion of the floor panel 12 curls up and the vehicle width direction outside end portion of the under member 14 that is fixed to the lower surface of the floor panel 12 moves toward the vehicle body upper side. When this happens, a bending moment M in which the vehicle body longitudinal direction is the axial direction is input to the flange portion 50 of the ductile member 40 that is fastened and fixed to this under member 14.

That is, force that acts to bend the flange portion 50 (i.e., the upper flange portion 44 and the lower flange portion 48) of the ductile member 40 that is fastened and fixed to the under member 14 (i.e., force that acts to move the vehicle width direction outside end portion of the flange portion 50 toward the vehicle body upper side), with the boundary portion 43A between the upper main body portion 43 and the upper flange portion 44 as the fulcrum, is applied to this flange portion 50.

Here, the flange portion 50 (i.e., the ductile member 40) has ductility due to being made of metal (high-strength steel plate or ultrahigh-strength steel plate). Also, the inclined portions 44A and 48A (i.e., bend initiators) that face downward toward the vehicle width direction inside are formed on the upper main body portion 43 side of the upper flange portion 44 and on the lower main body portion 47 side of the lower flange portion 48 that form the flange portion 50, and to the vehicle width direction outside of the battery frame 20. Furthermore, the upper flange portion 44 and the lower flange portion 48 are joined by adhesive.

Therefore, the flange portion 50 will easily bend and deform toward the vehicle body upper side with the boundary portion 43A as the fulcrum. Accordingly, the bending moment M input to the flange portion 50 is efficiently absorbed by the bending deformation of the flange portion 50 toward the vehicle body upper side, and is thus inhibited or prevented from being transmitted to the battery frame 20. That is, when there is a side impact of the vehicle, the stress load applied from the under member 14 to the battery frame 20 via the flange portion 50 is able to be reduced or eliminated.

Also, the flange portion 50 has ductility and will therefore not break simply by being bent and deformed toward the vehicle body upper side (i.e., the flange portion 50 is inhibited or prevented from breaking). Therefore, the battery frame 20 will not separate from the under member 14, so the fuel cell stack 16 will not detach from the vehicle.

Meanwhile, when an impact load is input from the vehicle width direction outside, the energy absorbing member 70 (i.e., the outer member 76 and the inner member 72) moves while plastic deforming toward the vehicle width direction inside, absorbing some of the impact load that is input, and transmitting some of the rest of the impact load to the under member 14 and the battery frame 20.

Here, the side wall portion 28 of the lower frame 26 of the battery frame 20 is formed bent so as to overlap with the side wall portion 47C of the lower main body portion 47, and the upper end portion 28A of the side wall portion 28 extends toward the vehicle body upper side to the boundary portion 49 between the lower main body portion 47 and the lower flange portion 48. Also, the block portion 73 (i.e., the side wall portion 73A) of the inner member 72 is arranged close to the side wall portion 28 in the vehicle width direction.

Therefore, the energy absorbing member 70 (i.e., the block portion 73 of the inner member 72) that has moved while plastic deforming toward the vehicle width direction inside is able to reliably strike the side wall portion 28 of the lower frame 26, so some of the impact load heading toward the vehicle width direction inside that is input when there is a side impact of the vehicle (indicated by arrow F) is able to be efficiently transmitted to the side wall portion 28 (i.e., the side wall portion 47C).

That is, some of the impact load input when there is a side impact of the vehicle (indicated by arrow F) is able to be transmitted to the end surface portion 38 of the core member 30, i.e., to the plurality of rows of protruding portions 33, via the side wall portion 47C of the lower ductile member 46 (i.e., the lower main body portion 47) and the side wall portion 28 of the lower frame 26, and is thus able to be absorbed by this plurality of rows of protruding portions 33. Accordingly, sectional collapse of the battery frame 20 is able to be inhibited or prevented.

Also, the protruding portion 47B of the lower main body portion 47 of the lower ductile member 46 is fixed sandwiched by the core member 30 (i.e., the main body portion 32) and the lower frame 26 (i.e., the bottom portion 27). Therefore, the protruding portion 47B of the lower main body portion 47 is able to be inhibited or prevented from peeling away from the core member 30 and the lower frame 26 even if the flange portion 50 bends and deforms toward the vehicle body upper side when there is a side impact of the vehicle.

Also, the upper main body portion 43 of the upper ductile member 42 is fixed sandwiched by the core member 30 (i.e., the inclined wall 36 and the upper wall 37) and the upper frame 22 (i.e., the inclined portion 24 and the flange portion 25). Therefore, the upper main body portion 43 is able to be inhibited or prevented from peeling away from the core member 30 and the upper frame 22 not only when the flange portion 50 bends and deforms toward the vehicle body upper side, but also when the flange portion 50 bends and deforms toward the vehicle body lower side, when there is a side impact of the vehicle.

As shown in FIG. 3, when the flange portion 50 bends and deforms toward the vehicle body upper side, force toward the vehicle body upper side is applied to the vehicle width direction outside end portion of the upper flange portion 44, so force (hold-down force) toward the core member 30 (i.e., the inclined wall 36 and the upper wall 37) side is applied to the upper main body portion 43. That is, force in a direction in which the upper main body portion 43 would peel away from the core member 30 (i.e., the inclined wall 36 and the upper wall 37) tends not to be applied to the upper main body portion 43.

Figure 4:
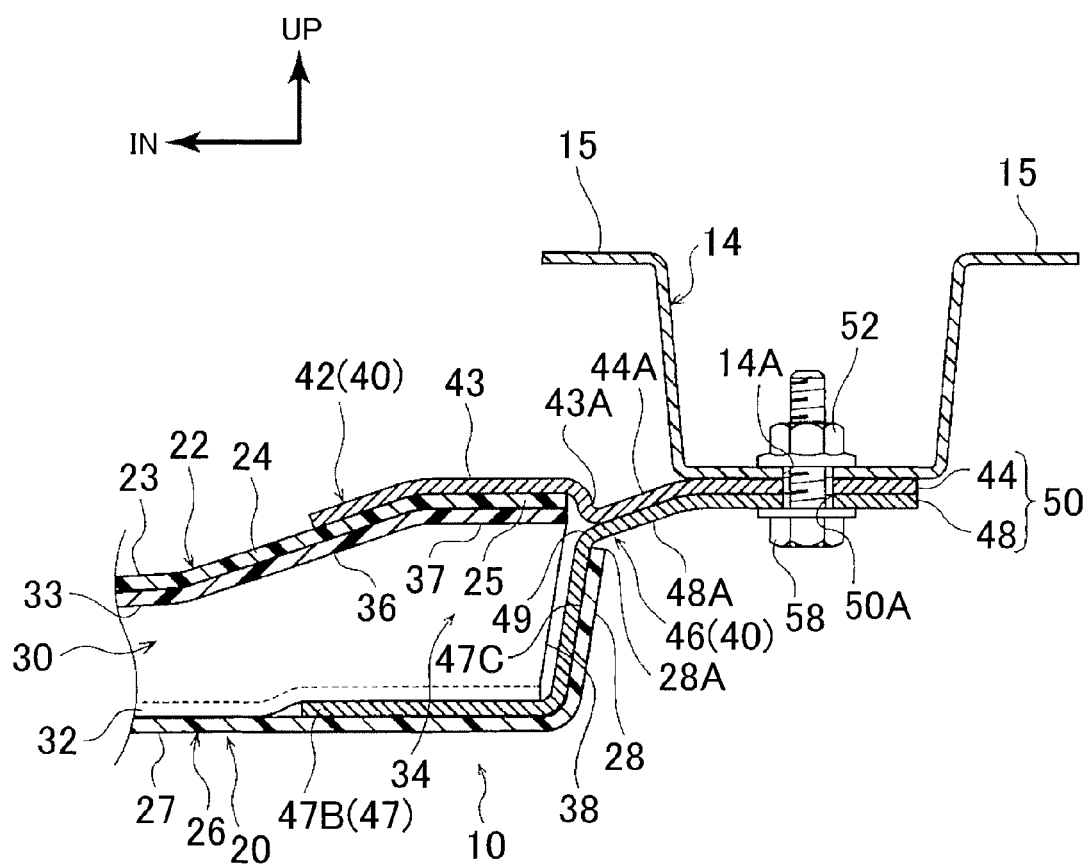
FIG. 4 is a partial enlarged front sectional view of a modified example of the vehicle battery mounting structure according to the example embodiment.

Therefore, when the flange portion 50 is configured only to bend and deform toward the vehicle body upper side, the upper main body portion 43 may be joined to the upper surface of the upper frame 22 (i.e., the inclined portion 24 and the flange portion 25), as shown in FIG. 4. That is, the upper main body portion 43 does not have to be sandwiched by the core member 30 (i.e., the inclined wall 36 and the upper wall 37) and the upper frame 22 (i.e., the inclined portion 24 and the flange portion 25).

Figure 5:
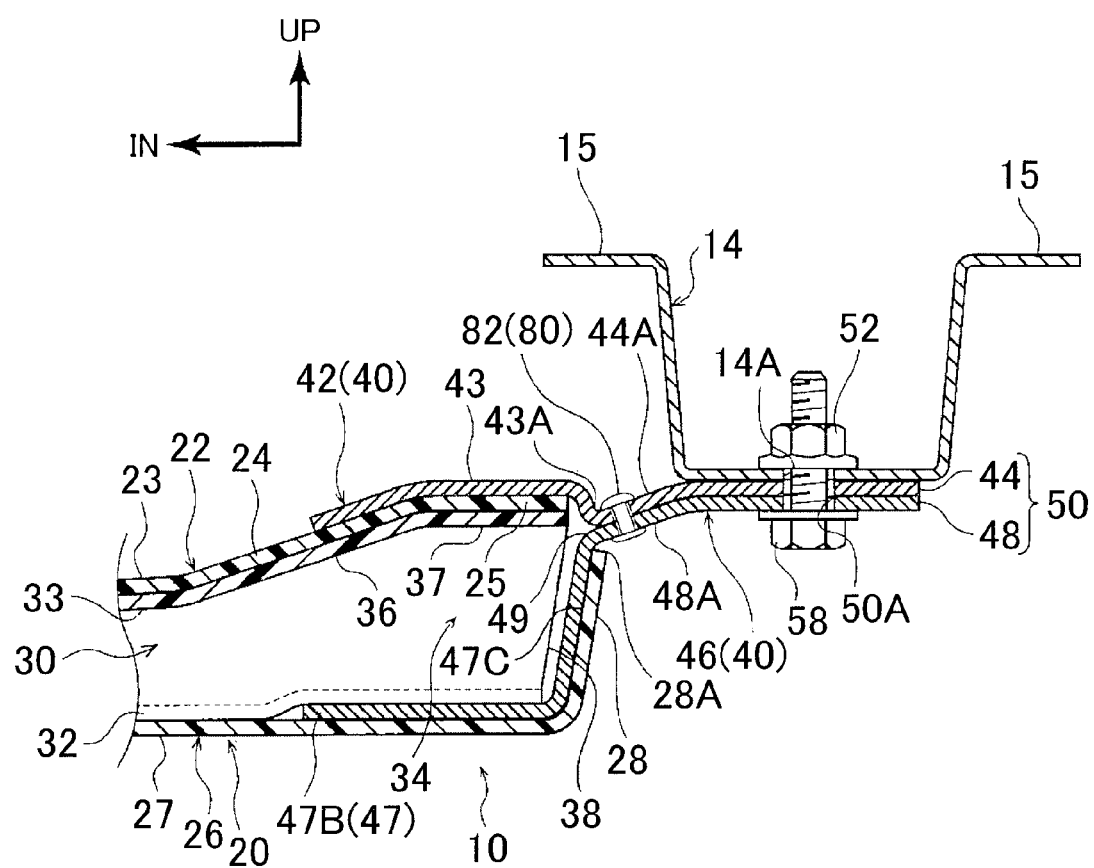
FIG. 5 is a partial enlarged front sectional view of another modified example of the vehicle battery mounting structure according to the example embodiment.

Also, in this case, as shown in FIG. 5, the upper main body portion 43 side (i.e., the boundary portion 43A side) of the upper flange portion 44 and the lower main body portion 47 side (i.e., the boundary portion 49 side) of the lower flange portion 48 are preferably joined by a rivet 82 as one example of joining means 80. That is, the upper main body portion 43 side of the upper flange portion 44 and the lower main body portion 47 side of the lower flange portion 48 are preferably strongly joined at parts by a plurality of rivets 82 which are arranged in the longitudinal direction of the flange portion 50 with a predetermined gap therebetween.

Accordingly, when the flange portion 50 bends and deforms toward the vehicle body upper side, the upper main body portion 43 side of the upper flange portion 44 and the lower main body portion 47 side of the lower flange portion 48 will not come apart from each other (i.e., will not open up), so the flange portion 50 bends and deforms even more easily (even more actively) with the plurality of rivets 82 (the joining means 80) as bend initiators, and the lower flange portion 48 is even more resistant to peeling away from the core member 30 (i.e., the inclined wall 36 and the upper wall 37).

That is, when the upper main body portion 43 side of the upper flange portion 44 and the lower main body portion 47 side of the lower flange portion 48 come apart from each other (i.e., open up) when the flange portion 50 bends and deforms toward the vehicle body upper side, bending deformation of the flange portion 50 toward the vehicle body upper side is impeded, and the upper flange portion 44 side of the upper main body portion 43 may peel away from the core member 30 (i.e., the inclined wall 36 and the upper wall 37).

If bending deformation of the flange portion 50 toward the vehicle body upper side is impeded, the bending moment M input to the flange portion 50 will end up being transmitted as it is to the battery frame 20, and moreover, if the upper flange portion 44 side of the upper main body portion 43 peels away from the core member 30, the cross-section of the battery frame 20 will end up collapsing. Therefore, it is desirable to strongly join the upper main body portion 43 side of the upper flange portion 44 and the lower main body portion 47 side of the lower flange portion 48 together so that they will not come apart.

As a result, bending deformation of the flange portion 50 toward the vehicle body upper side is more effectively promoted, so the bending moment M input to the flange portion 50 is more efficiently absorbed, and thus further inhibited or prevented from being transmitted to the battery frame 20. That is, when there is a side impact of the vehicle, the stress load applied from the under member 14 to the battery frame 20 via the flange portion 50 is able to be further reduced or eliminated, so sectional collapse of the battery frame 20 is able to be further inhibited or prevented.

Figure 6:
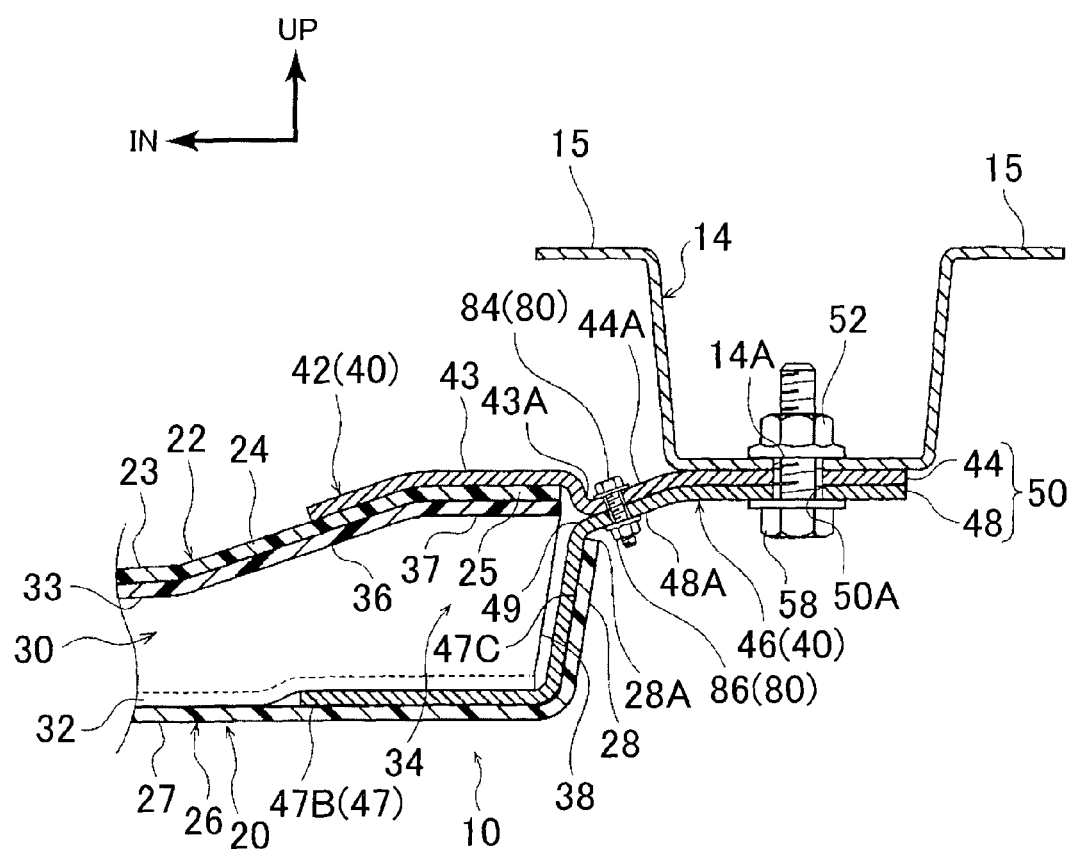
FIG. 6 is a partial enlarged front sectional view of yet another modified example of the vehicle battery mounting structure according to the example embodiment.

The joining means 80 is not limited to the rivet 82, and may also be a bolt 84 and a nut 86, as shown in FIG. 6, for example. The configuration may also be such that when the upper main body portion 43 side of the upper flange portion 44 and the lower main body portion 47 side of the lower flange portion 48 are strongly joined at parts by the rivet 82 or the bolt 84 and the nut 86, as shown in FIGS. 5 and 6, the upper main body portion 43 side of the upper flange portion 44 and the lower main body portion 47 side of the lower flange portion 48 are not joined together by adhesive.

Conversely, the configuration may also be such that when the upper main body portion 43 side of the upper flange portion 44 and the lower main body portion 47 side of the lower flange portion 48 are strongly joined together either at parts or continuously by adhesive or welding or the like, the upper main body portion 43 side of the upper flange portion 44 and the lower main body portion 47 side of the lower flange portion 48 are not joined together by the rivet 82 or the bolt 84 and the nut 86. That is, the joining means 80 also includes adhesive and welding and the like.

Figure 7:
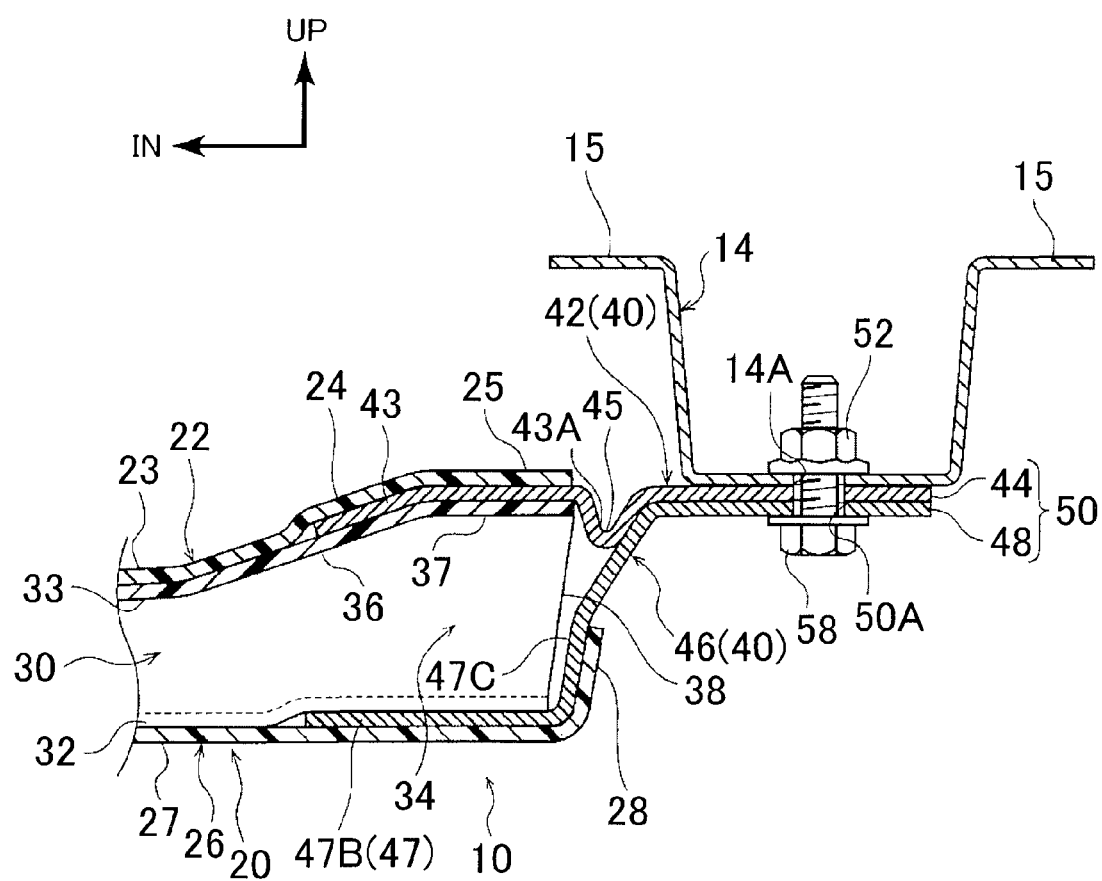
FIG. 7 is a partial enlarged front sectional view of still yet another modified example of the vehicle battery mounting structure according to the example embodiment.

Also, a recessed portion 45 (i.e., a bend initiator) that is generally U-shaped (i.e., the boundary portion 43A is generally arc-shaped in a sectional view) or V-shaped when viewed from the vehicle body longitudinal direction, may be formed on the upper main body portion 43 side of the upper flange portion 44 that is to the vehicle width direction outside of the battery frame 20, i.e., may be formed on the boundary portion 43A between the upper main body portion 43 and the upper flange portion 44, as shown in FIG. 7.

Accordingly, the vehicle width direction outside end portion of the flange portion 50 more easily bends and deforms toward the vehicle body upper side with the boundary portion 43A between the upper main body portion 43 and the upper flange portion 44, i.e., with the recessed portion 45, as the fulcrum, so the stress load applied from the under member 14 to the battery frame 20 via the flange portion 50 is able to be further reduced or eliminated.

Also, the configuration may be such that the upper main body portion 43 side (i.e., the recessed portion 45 side) of the upper flange portion 44 shown in FIGS. 1 to 3 and 7, and the lower main body portion 47 side of the lower flange portion 48, are strongly joined at parts by the joining means 80, i.e., by the plurality of rivets 82 or the plurality of bolts 84 and nuts 86, or are strongly joined at parts or continuously by adhesive or welding or the like.

Heretofore, the vehicle battery mounting structure 10 according to this example embodiment has been described based on the drawings, but the vehicle battery mounting structure 10 according to the example embodiment is not limited to the drawings. That is, appropriate design modifications are also possible without departing from the scope of the invention. For example, the ductile member 40 is not limited to being made of high-strength steel plate or ultra-high-strength steel plate. That is, the ductile member 40 may also be made of aluminum alloy or steel having a certain hardness.

Also, the flange portion 50 of the ductile member 40 is not limited to being fastened and fixed to the under member 14 that is joined and fixed to the lower surface of the floor panel 12. For example, the flange portion 50 of the ductile member 40 may also be fastened and fixed to a bracket or the like, not shown, that is joined and fixed to the lower surface of the floor panel 12. Also, the term "fasten" in this example embodiment is not limited to fastening by a bolt and a nut, and may also include fastening (attaching) by another fastener, not shown.

Also, the upper flange portion 44 and the lower flange portion 48 are not limited to being overlapped and joined together. That is, an inclination angle of the inclined portion 44A and an inclination angle of the inclined portion 48A may be different, and the inclined portion 44A and the inclined portion 48A may not overlap with each other (i.e., may be separated from each other).

Moreover, the upper main body portion 43 and the lower main body portion 47 of the ductile member 40 are not limited to being joined to the battery frame 20 by adhesive. For example, the upper main body portion 43 and the lower main body portion 47 of the ductile member 40 may also be joined by a joining member such as the rivet 82.

Also, the battery frame 20 of this example embodiment is not limited to being configured to support the fuel cell stack 16. For example, accessories and the like of the fuel cell stack 16 (together with the fuel cell stack 16) may also be supported by the battery frame 20. Also, the fuel cell stack 16 according to this example embodiment may be a secondary battery.

What is claimed is:

1. A vehicle battery mounting structure comprising:
a battery frame that includes a battery upper frame made of resin and a battery lower frame made of resin, and that is arranged on a vehicle body lower side of a floor panel and supports a battery; and
a ductile member that has an upper main body portion joined to the battery upper frame, an upper flange portion continuously provided on a vehicle width direction outside end portion of the upper main body portion, a lower main body portion joined to the battery lower frame, and a lower flange portion continuously provided on the vehicle width direction outside end portion of the lower main body portion, in which the upper flange portion and the lower flange portion are overlapped and fixed to a lower surface side of the floor panel, wherein:
the resin is fiber-reinforced;
the vehicle battery mounting structure includes an intermediate member arranged between the battery upper frame and the battery lower frame;
the battery frame supports the battery from the vehicle body lower side; and
the lower main body portion is sandwiched by the intermediate member and the battery lower frame.

2. The vehicle battery mounting structure according to claim 1, wherein
the battery lower frame is such that the vehicle width direction outside end portion thereof extends to a boundary portion between the lower main body portion and the lower flange portion.

3. The vehicle battery mounting structure according to claim 1, wherein the upper main body portion is sandwiched by the intermediate member and the battery upper frame.

4. The vehicle battery mounting structure according to claim 1, wherein
the upper flange portion has an inclined portion that is inclined downward toward the vehicle width direction inside, on an upper main body portion side of the upper flange portion, and to the vehicle width direction outside of the battery frame.

5. The vehicle battery mounting structure according to claim 1, wherein
the upper flange portion has a recessed portion that is U-shaped when viewed from a vehicle body longitudinal direction, on an upper main body portion side of the upper flange portion, and to the vehicle width direction outside of the battery frame.

6. The vehicle battery mounting structure according to claim 1, wherein
an upper main body portion side of the upper flange portion and a lower main body portion side of the lower flange portion are joined by joining means.

7. The vehicle battery mounting structure according to claim 6, wherein
the joining means includes at least one of a rivet, a bolt, a nut, adhesive, and welding.

8. The vehicle battery mounting structure according to claim 1, wherein
the ductile member has a joining portion where an upper main body portion side of the upper flange portion and a lower main body portion side of the lower flange portion are joined.

9. The vehicle battery mounting structure according to claim 1, wherein the ductile member is made of metal.

10. The vehicle battery mounting structure according to claim 1, wherein
a portion where the upper main body portion and the battery upper frame are joined is separated in a vehicle vertical direction from a portion where the lower main body portion and the battery lower frame are joined.

11. The vehicle battery mounting structure according to claim 1, wherein
the upper flange portion is directly fixed to an under member fixed to the lower surface side of the floor panel.

* * * * *